Patented Oct. 1, 1929

1,730,211

UNITED STATES PATENT OFFICE

JULIUS HÖPKER, OF SODEN-ON-THE-TAUNUS, GERMANY, ASSIGNOR TO GENERAL ANILINE WORKS, INC., OF NEW YORK, N. Y., A CORPORATION OF DELAWARE

PROCESS OF PRODUCING RESISTS IN DYEING WITH VAT DYESTUFFS

No Drawing. Application filed April 30, 1928, Serial No. 274,170, and in Germany May 6, 1927.

The present invention relates to the production of resists in dyeing with vat dyestuffs.

I have found that resists in dyeing with vat dyestuffs can be easily produced by printing upon the material an oxidizing agent, such as for instance sodium meta-nitro-benzenesulfonate or sodium bichromate or a mixture of both these salts with an aqueous solution of an alkyl ether of cellulose, drying the material and then dyeing it in the usual manner in the hot dye liquor of a vat dyestuff. Printing colors thus prepared can be easily applied and yield good resist effects because the alkyl ethers of cellulose are completely precipitated on the fiber even by a small quantity of the alkali, particularly owing to the elevated temperature of the vat-dye liquor.

There have already been used oxidizing agents in a preparatory printing process in order to produce resists in a subsequent printing process with vat dyestuffs, but resist agents obtained by means of the hitherto available thickening agents could not be used for dyeing with vat dyestuffs because the thickening agents while being in the hot dye-liquor are detached from the fiber.

The following examples serve to illustrate my invention but are not intended to limit it thereto:

1. A resist printing paste is prepared as follows:

250 gr. of a 15% aqueous solution or cellulose methyl ether are mixed and stirred with
250 gr. of cold water and there are then introduced
250 gr. sodium meta-nitro-benzenesulfonate into
250 gr. water 1 kgr.

The paste thus prepared is printed on the material which is then dried and dyed at 79° C. in a vat liquor prepared with the following ingredients:

30 gr. of 5.7.5'.7'-tetrabromindigo paste 20%
40 gr. caustic soda solution of 40° Bé.
16 gr. of hydrosulfite concentrated powder the whole being made up to 1 liter.

The material, after being dyed, is washed, soaped, and dried.

2. A resist printing paste is prepared as follows:

250 gr. of a 15% solution of cellulose methyl ether are mixed with
250 gr. of cold water and there is then added a solution of
200 gr. of sodium bichromate in
300 gr. of water 1 kgr.

The paste thus prepared is printed on the material which is then dried and dyed at 78° C. in a vat-liquor prepared with the following ingredients:

30 gr. of N-dihydro-1.2.1'.2'-anthraquinone azine
100 gr. of caustic soda solution of 30° Bé.
70 gr. of glycose (1:1)
12 gr. of hydrosulfite concentrated powder the whole being made up to 1 liter.

The material, after being dyed, is washed, soaped at the boil, rinsed and dried.

3. A white-resist printing paste (I) is prepared as follows:

250 gr. of a 15% aqueous solution of cellulose methyl ether are mixed and stirred with
250 gr. of cold water and there are then added
250 gr. of sodium meta-nitro-benzenesulfonate and
250 gr. of water 1 kgr.

The paste thus prepared is printed on the material which is then dried and dyed at 75° C. in a vat-liquor prepared with the following ingredients:

30 gr. of 5.7.5'.7'-tetrabromindigo paste
900 gr. of hot water
40 gr. of caustic soda solution of 40° Bé.
16 gr. of hydrosulfite conc. powder the whole being made up to 1 liter.

The material, after being dipped into the above liquor for 20 seconds, is washed, soaped, rinsed and dried.

4. A white-resist printing paste (II) is prepared as follows:

250 gr. of a 15% aqueous solution of cellulose methylether are mixed with
250 gr. of cold water and there is then added a solution of
200 gr. of sodium bichromate in
300 gr. of water 1 kgr.

The paste thus prepared is printed on the material which is then dried and dyed at 78° C. in a vat-liquor prepared with the following ingredients:

30 gr. of N-dihydro-1.2.1'.2'-anthraquinone azine paste
100 gr. of caustic soda solution of 30° Bé.
600 gr. of boiling water
70 gr. of glycose (1:1)
16 gr. of hydrosulfite concentrated powder the whole being made up to 1 liter.

The material, after being dipped into the above liquor for 20 seconds, is washed, soaped at the boil, rinsed and dried.

5. A white resist-printing paste (III) is prepared as follows:

500 gr. of the white-resist printing paste (I) obtainable according to Example 3 are mixed with
500 gr. of the white-resist printing paste (II) obtainable according to Example 4.

The paste thus prepared is printed on the material, dried and dyed at 78° C. in a vat liquor prepared with the following ingredients:

30 gr. of N-dihydro-1-2-1'-2'-anthraquinone azine paste
100 gr. of caustic soda solution of 30° Bé.
600 gr. of boiling water
70 gr. of glycose (1:1)
16 gr. of hydrosulfite concentrated powder the whole being made up to 1 liter.

The material after being dipped into the above liquor for 20 seconds is washed, soaped at the boil, rinsed and dried.

6. A red-resist printing paste is prepared as follows: To 880 gr. of the white-resist printing paste I. or II. or III., obtainable according to Examples 3, 4 and 5 respectively, are added
100 ccm. of diazotized 5-chloro-2-amino-1-toluene and
20 gr. of sodium acetate 1 kgr.

the said diazotized base being prepared by means of 10 gr. of 5-chloro-2-amino-1-toluene, 20 gr. of water, 11 ccm. of hydrochloric acid of 20° Bé., 70 gr. of ice and water and 4,2 gr. of sodium nitrite, the whole being made up to 110 ccm.

The paste thus prepared is printed on the material previously treated with a naphthol-preparation which may be obtained by making 20 gr. of β-hydroxy naphthoic acid-5-chlor-2-toluidide into a paste with 20 gr. of sodium Turkey-red oil (50%), adding thereto 30 ccm. of caustic soda solution of 34° Bé. and making up the whole with hot water to one liter.

The material is then well dried and dyed at 78° C. in a vat-liquor prepared with the following ingredients:

30 gr. of N-dihydro-1.2.1'.2'-anthraquinone azine paste
100 gr. of caustic soda solution of 30° Bé.
600 gr. of boiling water
70 gr. of glycose (1:1)
16 gr. of hydrosulfite concentrated powder the whole being made up to 1 liter.

The material, after being dipped into the above liquor for 20 seconds, is washed, soaped at boiling temperature rinsed hot and dried.

I claim:

1. The process of producing resists in dyeing with vat dyestuffs, comprising the steps of printing upon the material a mixture of an oxidizing agent and an aqueous solution of a methyl ether of cellulose, drying the material and dyeing it in the vat-liquor in the usual manner.

2. The process of producing resists in dyeing with vat dyestuffs comprising the steps of printing upon the material a mixture of sodium meta-nitrobenzenesulfonate and an aqueous solution of a methyl ester of cellulose, drying the material and dyeing it in the vat-liquor in the usual manner.

In testimony whereof, I affix my signature.

JULIUS HÖPKER.